United States Patent Office 3,493,596
Patented Feb. 3, 1970

3,493,596
SYNTHESIS OF ORGANIC ISOCYANATES
William K. T. Gleim, Island Lake, Ill., assignor to Universal Oil Products Company, Des Plaines, Ill., a corporation of Delaware
No Drawing. Filed Mar. 23, 1966, Ser. No. 536,602
Int. Cl. C07c *119/04, 119/02;* C08a *22/44*
U.S. Cl. 260—453                                                          9 Claims

ABSTRACT OF THE DISCLOSURE

Organic isocyanates can be prepared by oxidizing an isonitrile with an oxidizing agent, such as air, in the presence of a mercury-containing compound, such as mercuric oxide, and a compound selected from the metal porphyrins and metal phthalocyanines. Toluene diisonitrile can be converted to toluene diisocyanate, an article of commerce useful in the preparation of urethane foams.

---

This invention relates to a process for the synthesis of organic isocyanates and more particularly, to a method for synthesizing alkyl or aryl isocyanates having the formula $R(NCO)_n$ wherein R is a monovalent or bivalent hydrocarbyl radical derived from an alkane containing up to about 10 carbon atoms or an aromatic hydrocarbon and $n$ is 1 or 2 which comprises oxidizing an isonitrile having the formula $R(NC)_n$.

The use of organic isocyanates and particularly aryl polyisocyanates is becoming of increasing importance in the polymer field. For example, toluene diisocyanates or benzene diisocyanates are improtant intermediates in the preparation of polyurethane foams. These polyurethane foams are used in many phases in the commercial world today. For example, the foams are used for acoustical purposes such as sound deadeners in walls and ceilings. In addition, the foams may also be used as insulating materials for the maintainance of heat or cold in a given area. By incorporating these isocyanates with certain other materials, especially polyhalo-substituted polyhydromethanonaphthalenedicarboxylic anhydrides, it is possible to obtain insulating materials or acoustical materials which also possess fire retardant properties as well as other desirable properties. For purposes of this invention, the term "organic isocyanates" as used in the present specification will refer to both organic mono-isocyanates and organic polyisocyanates.

It is therefore an object of this invention to provide a novel process for the synthesis of organic isocyanates.

A further object of this invention is to provide a novel process for synthesizing alkyl and aryl isocyanates utilizing a catalytic reaction rather than a chemical reaction.

In one aspect, an embodiment of this invention is found in a process for the preparation of an organic isocyanate which comprises oxidizing an organic isonitrile with an oxidizing agent at oxidation conditions in the presence of a mercury containing compound and a compound selected from the group consisting of metal porphyrins and metal phthalocyanines, and recovering the resultant organic isocyanate.

A specific embodiment of this invention is found in a process for the preparation of an organic isocyanate which comprises oxidizing toluene diisonitrile with air at a temperature in the range of from about 0° to about 80° C. in the presence of mercuric oxide and cobalt phthalocyanine, and recovering the resultant toluene diisocyanate.

Other objects and embodiments will be found in the following further detailed description of this invention.

As hereinbefore set forth, the present invention is concerned with a process for preparing organic isocyanates in a catalytic reaction rather than a chemical type reaction. It is known in the art that organic amines such as alkylamines or arylamines may be readily and economically converted into isonitriles by treating said amines with a haloalkane such as chloroform and a caustic or alkaline material such as potassium hydroxide, sodium hydroxide, etc. Examples of alkylamines or arylamines which may be converted into the corresponding isonitriles include methylamine, ethylamine, propylamine, butylamine, isobutylamine, pentylamine, the isomeric hexyl-, octyl-, nonyl-, decylamines, etc., ethylenediamine, propylenediamine, pentylenediamine, etc., aniline, p-phenylenediamine, o-phenylenediamine, m-phenylenediamine, p-methylaniline, p-ethylaniline, p-propylaniline, p-isopropylaniline, 4-methyl-o-phenylenediamine, 2-methyl-m-phenylenediamine, 5-methyl-m-phenylenediamine, 4-methyl-m-phenylenediamine, 2-methyl-p-phenylenediamine, 4-ethyl-o-phenylenediamine, 2-ethyl-m-phenylenediamine, 5-ethyl-m-phenylenediamine, 4-ethyl-m-phenylenediamine, etc. It is to be understood that the aforementioned compounds are only representative of the class of compounds which may be converted into isonitriles.

The organic isonitriles of the type hereinbefore set forth above may then be converted into the desired corresponding isocyanates in a catalytic type reaction by treating said isonitriles with mercury containing compounds in the presence of a metal porphyrin or metal phthalocyanine. In the prior art the preparation of the isocyanates was accomplished according to the folowing equation:

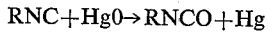

$$RNC + HgO \rightarrow RNCO + Hg$$

in which R comprises an alkyl or aryl radical. However, it is to be noted from the above equation that the mercuric oxide is utilized as one of the reactants in the chemical reaction and therefore must be continuously replaced, inasmuch as it enters into the reaction. In contradistinction to this, the present invention provides a process for preparing isocyanates by utilizing only catalytic amounts of a mercury containing compound which can be reused without adding an additional amount of a mercury containing compound. This is effected by subjecting the isonitrile to the action of an oxidizing agent in the presence of a small amount of a mercury containing compound such as mercuric oxide and a metal porphyrin or metal phthalocyanine of the type hereinafter set forth in greater detail. The oxidizing agents which may be utilized to effect the process will comprise those which contain oxygen and may be either air, pure oxygen or oxygen diluted with an inert gas such as nitrogen. Mercury containing compounds which may be utilized include mercury metal, mercurous oxide, mercuric oxide, etc.

Suitable metal porphyrins or metal phthalocyanines which may be used comprise iron porphyrin, iron phthalocyanine, manganese porphyrin, manganese phthalocyanine, vanadium porphyrin, vanadium phthalocyanine, chromium porphyrin, chromium phthalocyanine, cobalt porphyrin, cobalt phthalocyanine, the preferred metal complex comprising cobalt porphyrin and cobalt phthalocyanine.

The process whereby the isonitrile is converted into the corresponding isocyanate is effected under certain conditions which are necessary in order that the desired product may be prepared in an appropriate manner with a minimum amount of undesired products being formed. For example, the process is effected at temperatures ranging from about 0° to about 80° C. and preferably in a range of from about 0° to about ambient (25° C.). When utilizing the latter range of temperatures it becomes necessary to utilize cooling means so that the temperature is maintained at ambient temperature or below. In addition, the conversion of the isonitrile to the isocyanate must be effected in a substantially anhydrous atmosphere.

Therefore, the feed stock comprising the isonitrile must be in an anhydrous condition and in addition, the oxidizing agent such as air must also be anhydrous in nature. If so desired, the process may be effected in the presence of an anhydrous substantially inert organic diluent such as benzene, toluene, ethylbenzene, xylene, n-pentane, n-hexane, n-heptane, cyclopentane, methylcyclopentane, etc. The above conditions are necessary inasmuch as relatively high temperatures, that is, above about 80° C. will tend to favor an increase in the rearrangement of the alkyl or aryl isonitrile to the alkyl or aryl nitrile. In addition, the presence of water will also be detrimental to the reaction inasmuch as said water will lead to the formation of the undesirable side products such as the original amine compound and carbon dioxide.

The process of the present invention may be effected in any suitable manner and may comprise either a batch or continuous type operation. When a batch type operation is used, a quantity of the alkylamine or arylamine of the type hereinbefore set forth is placed in an appropriate apparatus along with a catalytic amount of mercuric oxide, mercurous oxide or mercury and a metal porphyrin or metal phthalocyanine. The apparatus is maintained at the desired operating temperature while an oxidizing agent is charged thereto.

Upon completion of the desired residence time, the flow of oxidizing agent is discontinued and the reaction product is recovered and separated from the catalyst. The product is then subjected to fractional distillation under reduced pressure whereby the desired alkyl isocyanate or aryl isocyanate are separated and recovered.

It is also contemplated within the scope of this invention that the process may be effected in a continuous manner of operation. When such an operation is used, the alkyl isonitrile or aryl isonitrile is charged to a reaction zone which is maintained at the proper operating temperature, said reaction zone containing a catalyst comprising mercury, mercurous oxide or mercuric oxide and a metal porphyrin or metal phthalocyanine. In addition, the oxidizing agent is also continuously charged thereto. The feed stock is passed over the catalyst in either an upward or downward flow and is continuously withdrawn after having been in contact with the catalyst for a predetermined period of time. The reactor effluent is then subjected to a separation step whereby the unreacted starting material is separated and recycled to form a portion of the feed stock while the desired isocyanate is recovered. While a preferred continuous type of operation comprises a fixed bed type in which, as hereinbefore set forth, the feed stock passes over a fixed bed of the catalyst in either an upward or downward flow it is also contemplated that a moving bed operation may be employed in which the reactant and the catalyst may be passed either concurrently or countercurrently to each other, or a slurry type operation in which the catalyst is carried into the reaction zone as a slurry in the reactant.

Examples of organic isocyanates which may be prepared according to the process of this invention include methyl isocyanate, ethyl isocyanate, propyl isocyanate, butyl isocyanate, pentyl isocyanate, etc., ethyl diisocyanate, propyl diisocyanate, pentyl diisocyanate, etc., benzene isocyanate, p-benzene diisocyanate, o-benzene diisocyanate, m-benzene diisocyanate, p-toluene isocyanate, the isomeric toluene diisocyanates, etc. It is to be understood that the aforementioned isocyanates are only representative of the class of compounds which may be prepared and that the present invention is not necessarily limited thereto.

The following examples are given to illustrate the process of the present invention which, however are not intended to limit the generally broad scope of the present invention in strict accordance therewith.

EXAMPLE I

To a reaction vessel which is provided with means for controlling the temperature thereof is added 142 g. of toluene diisonitrile which has been passed over a drying agent before being charged to the reactor. The reactor which is provided with means for introducing an oxidizing agent also contains 20 g. of mercuric oxide and 0.1 g. of cobalt phthalocyanine. The temperature of the reactor is maintained at about 10° C. by means of an icebath while air is charged thereto for a period of about 4 hours. At the end of this time, the flow of air is discontinued and the reaction product is separated from the catalyst mixture. The mixture is then subjected to fractional distillation to separate the desired product comprising toluene diisocyanate, which is recovered from the unreacted toluene diisonitrile which is also recovered and reused as a part of the feed stock for subsequent operations.

EXAMPLE II

In this example, 127 g. of benzene diisonitrile are charged to a reactor containing a catalyst mixture comprising 20 g. of mercuric oxide and 0.1 g. of an iron porphyrin. The reactor is sealed and maintained at a temperature of about 10° C. while charging air thereto. Both the benzene diisonitrile and air are dried by passage over a drying agent prior to admission into said reactor. At the end of about 4 hours, the flow of air is discontinued and the reaction product is separated from the catalyst mixture. The aforesaid reaction mixture is then subjected to fractional distillation and the desired product comprising benzene diisocyanate is recovered therefrom.

EXAMPLE III

A reactor containing 20 g. of mercuric oxide and 0.1 g. of cobalt phthalocyanine is cooled to a temperature of about 10° C. by means of an icebath. Following this, 136 g. of hexyl diisonitrile is charged to the reactor which is thereafter sealed and air is charged thereto. The treatment is continued for a period of about 4 hours, at the end of which time the reaction product is separated from the catalyst mixture and subjected to fractional distillation under reduced pressure. The desired product comprising hexyl diisocyanate is recovered therefrom.

EXAMPLE IV

A reactor provided with means for charging air thereto is cooled to a temperature of about 10° C. by means of an icebath. To the reactor is added 20 g. of mercuric oxide and 0.1 g. of cobalt porphyrin. The charge stock comprising decyl diisonitrile is dried by passage over a drying agent and charged to the reactor. Following this, the reactor is sealed and air which has also been dried by passage over a drying agent is charged to the reactor for a period of about 4 hours. At the end of this time, the flow of air is discontinued, the reactor is opened and the mixture is separated from the catalyst. After subjecting the reaction mixture to fractional distillation the desired product comprising decyl diisocyanate is recovered.

The above experiment is repeated utilizing a charge stock comprising naphthalene diisonitrile in place of decyl diisonitrile. At the end of the reaction period, the mixture is subjected to fractional distillation under reduced pressure and the desired product comprising naphthalene diisocyanate is recovered.

I claim as my invention:

1. A process for the preparation of an isocyanate having the formula $R(NCO)_n$ wherein R is a monovalent or bivalent hydrocarbyl radical derived from an alkane containing up to about 10 carbon atoms or an aromatic hydrocarbon and $n$ is 1 or 2, which process comprises oxidizing an isonitrile having the formula $R(NC)_n$, wherein R and $n$ are as above defined, with a free oxygen-containing gas in a substantially anhydrous atmosphere at a temperature of about 0° to about 80° C. in contact with a catalytic amount of (1) mercury or an oxide of mercury and (2) a metal porphyrin or a metal phthalocyanine, the metal being selected from the group consisting of vanadium, chromium, manganese, iron and cobalt.

2. The process of claim 1 wherein said oxygen-containing gas is air and said temperature is from about 0° to about 25° C.

3. The process of claim 1 wherein said metal is cobalt.

4. The process of claim 1 wherein said metal is iron.

5. The process of claim 1 wherein said isonitrile is toluene diisonitrile and said isocyanate is toluene diisocyanate.

6. The process of claim 1 wherein said isonitrile is benzene diisonitrile and said isocyanate is benzene diisocyanate.

7. The process of claim 1 wherein said isonitrile is hexyl diisonitrile and said isocyanate is hexyl diisocyanate.

8. The process of claim 1 wherein said isonitrile is decyl diisonitrile and said isocyanate is decyl diisocyanate.

9. The process of claim 1 wherein said isonitrile is naphthalene diisonitrile and said isocyanate is naphthalene diisocyanate.

References Cited

UNITED STATES PATENTS

| | | | |
|---|---|---|---|
| 2,882,224 | 4/1959 | Gleim et al. | 260—314.5 XR |
| 3,002,013 | 9/1961 | Feuer et al. | 260—453 |

OTHER REFERENCES

Cook: Chemical Abstracts, vol. 33, pages 1328–30 (1939).

Feuer et al.: J. Org. Chem., vol. 23, pages 1107–9, page 1107 relied upon (1958).

JOSEPH P. BRUST, Primary Examiner

D. H. TORRENCE, Assistant Examiner

U.S. Cl. X.R.

260—2.5, 314, 314.5, 465, 465.1, 687